United States Patent
Wennerström et al.

(10) Patent No.: US 9,919,252 B2
(45) Date of Patent: Mar. 20, 2018

(54) AIR PURIFIER DEVICE WITH COUPLING MECHANISM

(71) Applicant: BLUEAIR AB, Stockholm (SE)

(72) Inventors: Johan Wennerström, Stockholm (SE); Elin Engberg, Stockholm (SE)

(73) Assignee: BLUEAIR AB, Stockholm (SE)

( * ) Notice: Subject to any disclaimer, the term of this patent is extended or adjusted under 35 U.S.C. 154(b) by 93 days.

(21) Appl. No.: 14/548,551

(22) Filed: Nov. 20, 2014

(65) Prior Publication Data
US 2015/0231542 A1    Aug. 20, 2015

(30) Foreign Application Priority Data
Feb. 18, 2014   (EP) .................................... 14155644

(51) Int. Cl.
| | | |
|---|---|---|
| *B01D 29/21* | (2006.01) | |
| *B01D 50/00* | (2006.01) | |
| *B01D 53/04* | (2006.01) | |
| *F24F 13/28* | (2006.01) | |
| *B01D 46/00* | (2006.01) | |

(52) U.S. Cl.
CPC ..... *B01D 46/0004* (2013.01); *B01D 46/0032* (2013.01)

(58) Field of Classification Search
CPC ........ B01D 29/21; B01D 53/04; B01D 50/00; F24F 13/28; Y10S 55/34
USPC .............. 55/471, 472, 385.2, 481, 486, 495, 55/DIG. 34; 95/273, 286; 96/224, 397, 96/97, 98, 99; 15/352, 353
See application file for complete search history.

(56) References Cited

U.S. PATENT DOCUMENTS

| | | |
|---|---|---|
| 521,862 A | 6/1894 | McConnell et al. |
| 1,502,862 A | 7/1924 | Menk |
| (Continued) | | |

FOREIGN PATENT DOCUMENTS

| | | |
|---|---|---|
| CN | 2130247 Y | 4/1993 |
| CN | 101010142 A | 8/2007 |
| (Continued) | | |

OTHER PUBLICATIONS

Office Action issued by the U.S. Patent and Trademark Office in U.S. Appl. No. 14/548,655, dated Nov. 2, 2015, 9 pages.
(Continued)

*Primary Examiner* — Frank Lawrence, Jr.
*Assistant Examiner* — Minh-Chau Pham
(74) *Attorney, Agent, or Firm* — Buchanan Ingersoll & Rooney P.C.

(57) ABSTRACT

An air purifier device is provided including a fan unit including a fan arranged to produce an air flow through the air purifier device, and a filter unit including a filter arranged to filter the air flow produced by the fan. The filter unit is adapted to stand on a support surface when the air purifier device is positioned for use. The air purifier device further includes a coupling mechanism arranged to secure the fan unit on top of the filter unit. The coupling mechanism includes two release means arranged on opposite outer sides of the fan unit, and the fan unit is releasable from the filter unit by actuating the two release means. The filter unit may be removed from the fan unit by a single action (or movement) by the user, whereby filter replacement of the air purifier device is facilitated.

11 Claims, 6 Drawing Sheets

(56) References Cited

U.S. PATENT DOCUMENTS

| | | | |
|---|---|---|---|
| 1,921,153 A | | 8/1933 | Cantwell |
| 2,415,621 A | | 2/1947 | Arnhym |
| 3,256,680 A | | 6/1966 | Coombs |
| 3,937,189 A | | 2/1976 | Beck |
| 4,634,342 A | | 1/1987 | Rodewald |
| 4,730,980 A | | 3/1988 | Hughes |
| 4,749,390 A | | 6/1988 | Burnett et al. |
| 4,781,526 A | | 11/1988 | Mead et al. |
| 5,266,090 A | | 11/1993 | Burnett |
| 5,422,795 A | | 6/1995 | Liu |
| 5,452,713 A | | 9/1995 | Vipond et al. |
| 5,601,636 A | | 2/1997 | Glucksman |
| 5,615,999 A | | 4/1997 | Sukup |
| 5,641,343 A | * | 6/1997 | Frey .................. B01D 46/0004 55/320 |
| 5,753,000 A | * | 5/1998 | Chiu ..................... B01D 46/24 55/357 |
| 5,753,002 A | | 5/1998 | Glucksman |
| 5,803,709 A | | 9/1998 | Matthews et al. |
| 5,997,619 A | | 12/1999 | Knuth |
| 6,174,340 B1 | | 1/2001 | Hodge |
| 6,447,586 B1 | * | 9/2002 | Campbell ......... B01D 46/0086 261/DIG. 65 |
| 6,450,760 B1 | | 9/2002 | Furukawa et al. |
| 6,540,804 B1 | * | 4/2003 | Wennerstrom ......... A47L 5/365 15/352 |
| 6,989,051 B2 | | 1/2006 | Parisi et al. |
| 7,074,250 B1 | * | 7/2006 | Chipner ............. B01D 46/0005 55/385.2 |
| 7,537,647 B2 | | 5/2009 | Adair et al. |
| 7,806,952 B2 | | 10/2010 | Fox et al. |
| 2002/0073664 A1 | * | 6/2002 | Campbell ............... F24F 13/28 55/471 |
| 2002/0088213 A1 | * | 7/2002 | McSweeney ............ F24F 3/16 55/467 |
| 2003/0202879 A1 | | 10/2003 | Huang et al. |
| 2004/0163542 A1 | | 8/2004 | Huang |
| 2004/0182054 A1 | * | 9/2004 | Kaylan ................. B01D 46/26 55/472 |
| 2006/0016333 A1 | | 1/2006 | Taylor et al. |
| 2006/0016335 A1 | | 1/2006 | Cox et al. |
| 2006/0053758 A1 | | 3/2006 | Wu et al. |
| 2006/0110272 A1 | | 5/2006 | Moore et al. |
| 2006/0201119 A1 | | 9/2006 | Song |
| 2006/0277875 A1 | | 12/2006 | Schuld |
| 2007/0070602 A1 | | 3/2007 | Huang |
| 2007/0277487 A1 | | 12/2007 | Thurin et al. |
| 2008/0028733 A1 | | 2/2008 | Paterson et al. |
| 2008/0066620 A1 | | 3/2008 | Wang |
| 2011/0064595 A1 | | 3/2011 | Kuang |
| 2011/0100221 A1 | | 5/2011 | Wu |
| 2012/0111188 A1 | | 5/2012 | Zanganeh et al. |
| 2012/0180666 A1 | | 7/2012 | Lim et al. |
| 2015/0231543 A1 | | 8/2015 | Wennerström et al. |
| 2015/0231645 A1 | | 8/2015 | Engberg et al. |
| 2015/0354578 A1 | | 12/2015 | Avedon |

FOREIGN PATENT DOCUMENTS

| | | |
|---|---|---|
| CN | 102 039 222 A | 5/2011 |
| CN | 204602410 U | 9/2015 |
| GB | 449903 A | 6/1936 |
| GB | 488781 A | 7/1938 |
| JP | S 61-153159 A | 7/1986 |
| JP | S 62-22937 A | 1/1987 |
| RU | 2 259 862 C2 | 9/2005 |
| SE | 9 804 475 L | 6/2000 |
| SE | 521 721 C2 | 12/2003 |
| WO | WO 95/34366 A1 | 12/1995 |
| WO | WO 98/50162 A1 | 11/1998 |
| WO | WO 00/30732 A1 | 6/2000 |
| WO | WO 2006/071503 A1 | 7/2006 |
| WO | WO 2013/165242 A1 | 11/2013 |
| WO | WO 2014/007558 A1 | 1/2014 |

OTHER PUBLICATIONS

Office Action issued by the U.S. Patent and Trademark Office in U.S. Appl. No. 14/548,655, dated Jun. 29, 2016, 13 pages.

Extended European Search Report dated Jul. 7, 2014 in EP 14155644.9, 6 pages, EPO, Munich, DE.

Extended European Search Report dated Jul. 7, 2014 in EP 14155645.6, 6 pages, EPO, Munich, DE.

Extended European Search Report dated Aug. 5, 2014 in EP 14155642.3, 8 pages, EPO, Munich, DE.

Official Action issued in Chinese Patent Application 201510015117.1, dated Jun. 27, 2016, 10 pages, State Intellectual Property Office of the P.R.C., CN, and English-language translation (12 pages).

Office Action (Rejection) dated May 18, 2015, by the U.S. Patent Office in corresponding U.S. Appl. No. 14/548,655. (16 pages).

Wennerström et al., U.S. Appl. No. 14/548,655, entitled "Air Purifier Device With Fan Duct," filed in the U.S. Patent and Trademark Office on Nov. 20, 2014.

Engberg et al., U.S. Appl. No. 14/548,364, entitled "Air Purifier Device With Ionizing Means," filed in the U.S. Patent and Trademark Office on Nov. 20, 2014.

* cited by examiner

AIR PURIFIER DEVICE WITH COUPLING MECHANISM

CROSS REFERENCE TO RELATED APPLICATIONS

The present application claims the benefit of European Application No. 14155644.9, filed on Feb. 18, 2014. The entire contents of European Application No. 14155644.9 are hereby incorporated herein by reference in their entirety.

FIELD OF THE INVENTION

The present invention generally relates to the field of air purifier devices. In particular, the present invention relates to air purifier devices with replaceable filters.

BACKGROUND OF THE INVENTION

Air purifier devices are used for cleaning indoor air from pollutants. Conventional air purifier devices comprise a fan arranged to produce an air flow through the air purifier device and a filter arranged to filter the air flow produced by the fan, whereby air-borne particles in the air flow adhere to the filter and purified air is exhausted from the air purifier device. After some time of usage, the filter eventually gets clogged by particles and needs to be replaced by a new filter in order to maintain the efficiency of the air purifier device.

WO9534366 shows an air purifier device comprising a housing accommodating a fan, a replaceable filter and a grille enclosing and securing the filter to the housing. The grille is releasable from connection with the housing by pressing a button located on top of the housing, whereby a user can replace the filter. The grille needs to be slightly tilted and lifted out of a base of the housing when removed from the housing.

A problem with known air purifier devices is that replacement of the filter is cumbersome and may be difficult for the user. Further, filter replacement difficulties may imply a risk that the replacement filter does not get properly positioned resulting in impaired function of the air purifier device.

SUMMARY OF THE INVENTION

It would be advantageous to achieve an air purifier device overcoming, or at least alleviating, the above mentioned drawbacks. In particular, it would be desirable to enable facilitated filter replacement of an air purifier device.

To better address one or more of these concerns, an air purifier device having the features defined in the independent claim is provided. Preferable embodiments are defined in the dependent claims.

Hence, according to an aspect, an air purifier device is provided. The air purifier device comprises a fan unit comprising a fan arranged to produce an air flow through the air purifier device, and a filter unit comprising a filter arranged to filter the air flow produced by the fan. The filter unit is adapted to stand on a support surface when the air purifier device is positioned for use. The air purifier device further comprises a coupling mechanism arranged to secure the fan unit on top of the filter unit. The coupling mechanism comprises two release means arranged on opposite outer sides of the fan unit, and the fan unit is releasable from the filter unit by actuating the two release means.

The present aspect is based on an idea of structurally dividing the air purifier device into a fan unit and a filter unit. The arrangement of the fan unit on top of the filter unit, and the arrangement of the two release means (which alternatively may be referred to as release actuators) on opposite outer sides of the fan unit enables a user to actuate the release means simultaneously with grabbing the fan unit at its opposite outer sides for lifting the fan unit from the filter unit. The filter may then be replaced by a replacement filter. Hence, the filter unit may be removed from the fan unit by a single action (or movement) by the user, whereby filter replacement of the air purifier device is facilitated. Facilitated filter replacement reduces the risk of incorrect positioning of the filter in the air purifier device and, thus, the risk of impaired function of the air purifier device. For example, the released fan unit may subsequently be secured to a replacement filter unit or the filter in the filter unit may be replaced by a replacement filter.

The support surface may e.g. be a floor or any other surface for supporting the air purifier device when in use.

In the present specification, the term "sides of the fan unit" may refer to lateral sides (e.g. formed by at least one side wall) of the fan unit extending in a direction from a top wall (or upper wall) and towards a bottom (or lower) wall of the air purifier device.

According to an embodiment, the two release means may be two release buttons (arranged on opposite outer sides of the fan unit), and the fan unit may be releasable from the filter unit by pushing the two release buttons, which further facilitates removal of the fan unit from the filter unit. According to an embodiment, the two release buttons may be arranged to be pushed inwards in the air purifying device. In the present embodiments, the pushing action performed by the user both actuates the release buttons and pinches (grabs) the fan unit for lifting it off from the filter unit, whereby the filter replacement is further facilitated and more intuitive for the user.

According to an embodiment, the filter unit may have a bottom wall adapted to face the support surface when the air purifier device is positioned for use, and the opposite outer sides of the fan unit may extend transverse (such as, at least substantially, perpendicular) relative to the bottom wall, whereby grabbing the outer sides of the fan unit is facilitated, which in turn facilitates replacing the filter unit. For example, the opposite outer sides may be formed by opposite outer portions of a side wall of the fan unit being substantially vertical when the air purifier device is positioned on a substantially horizontal support surface.

In an embodiment, the air purifier device may have a box-like shape, which facilitates positioning the fan unit in a correct position on top of the filter unit. For example, each one of the filter unit and the fan unit may have a box-like shape. Matching of the lower corners of the fan unit with the upper corners of the filter unit may indicate the right position for the user.

In the present specification, the term "box-like shape" may include any boxed shape with or without one or more rounded corners or edges.

According to an embodiment, the coupling mechanism may comprise two pairs of engagement parts. Each pair may comprise an engagement part arranged in the fan unit (which part may be referred to as a fan engagement part) and coupled to the release means, and an engagement part arranged in the filter unit (which part may be referred to as a filter engagement part). The engagement parts of each pair may be arranged to engage with each other so as to secure the fan unit to the filter unit, and to be released from the engagement by actuating the release means. The engagement parts may have any geometrical configuration allowing the fan engagement part to engage with the filter engagement part.

According to an embodiment, the filter may extend circumferentially along an inner side wall of the filter unit, which provides a relatively large filter area. The air purifier device may take in air circumferentially around the filter unit, which improves circulation of air in the room, which in turn improves the overall air purification in the room.

According to an embodiment, the air purifier device may further comprise an exhaust for exhausting purified air out of the air purifier device, wherein the exhaust may be arranged in a top wall of the fan unit. By having the exhaust in the top wall (instead of in the side wall), the side wall of the fan unit may be solid and, thus, more rigid to grab when exchanging the filter unit. In addition, the purified air may be exhausted upwards from the air purifier device, which reduces whirling up dust from the support surface.

According to an embodiment, the air purifier device may further comprise an ionizing device arranged in the fan unit so as to ionize particles in the air flow. By having the ionizing device arranged in the fan unit (instead of in the filter unit), the complete filter unit may be replaced when the filter need to be replaced. Hence, the fan unit including the ionizing device may simply be moved to another (new) filter unit, whereby filter replacement is further facilitated.

According to an embodiment, the filter unit may be a disposable filter unit. Hence, the whole filter unit may be disposed and replaced by a new filter unit. With the present embodiment, replacing the filter of the air purifier device does not necessarily require removing/separating any further parts of the air purifier device but the fan unit from the filter unit. Hence, only a single action (or movement) may be required to replace the filter unit, whereby filter replacement is facilitated.

It is noted that embodiments of the invention relates to all possible combinations of features recited in the claims.

BRIEF DESCRIPTION OF THE DRAWINGS

This and other aspects will now be described in more detail in the following illustrative and non-limiting detailed description of embodiments with reference to the appended drawings.

All the figures are schematic, not necessarily to scale, and generally only show parts which are necessary in order to elucidate the embodiments, wherein other parts may be omitted. Like reference numerals refer to like elements throughout the description and drawings.

DETAILED DESCRIPTION OF EMBODIMENTS

Figure 1:
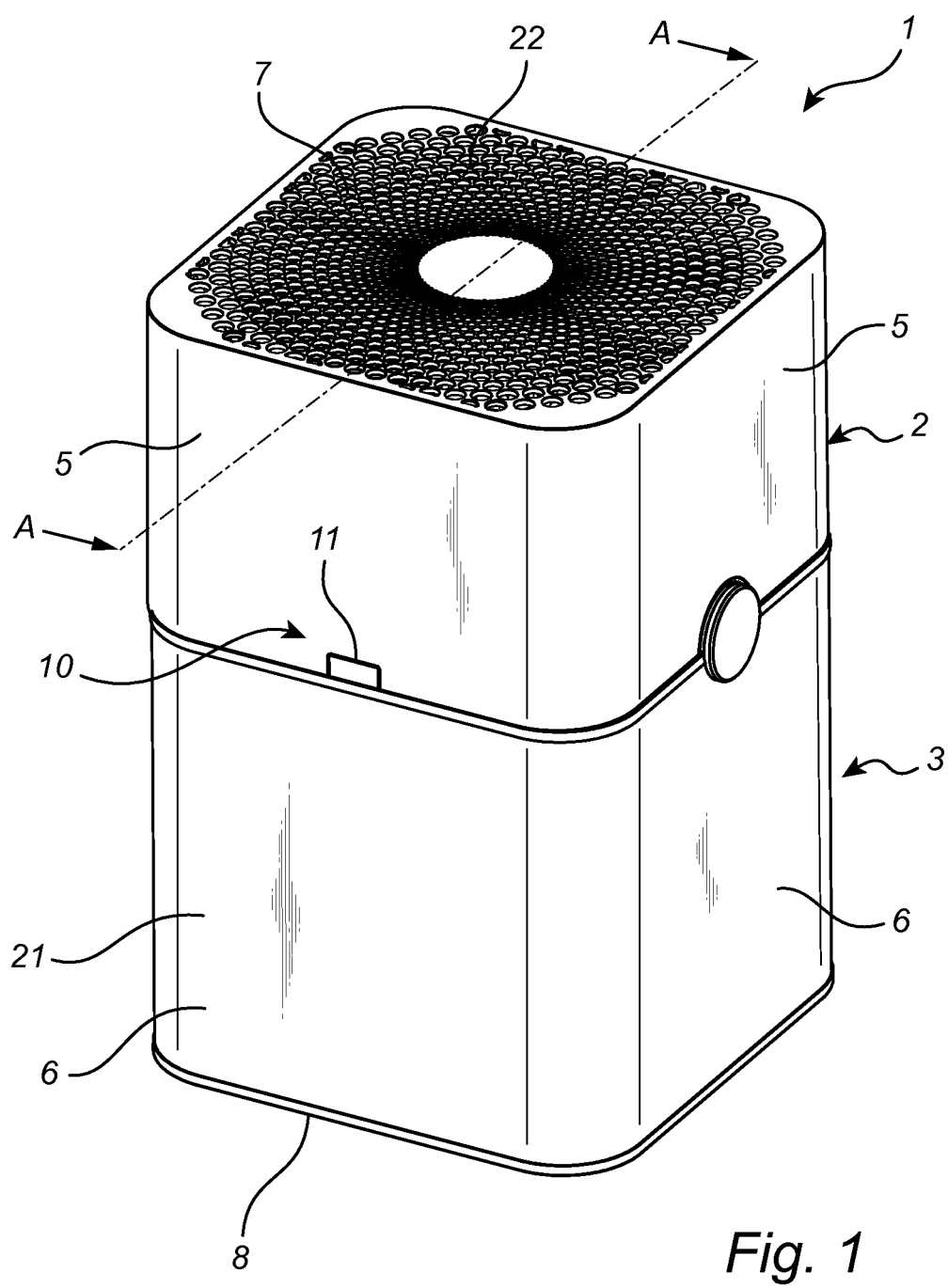
FIG. 1 shows an air purifier device.
Figure 2:
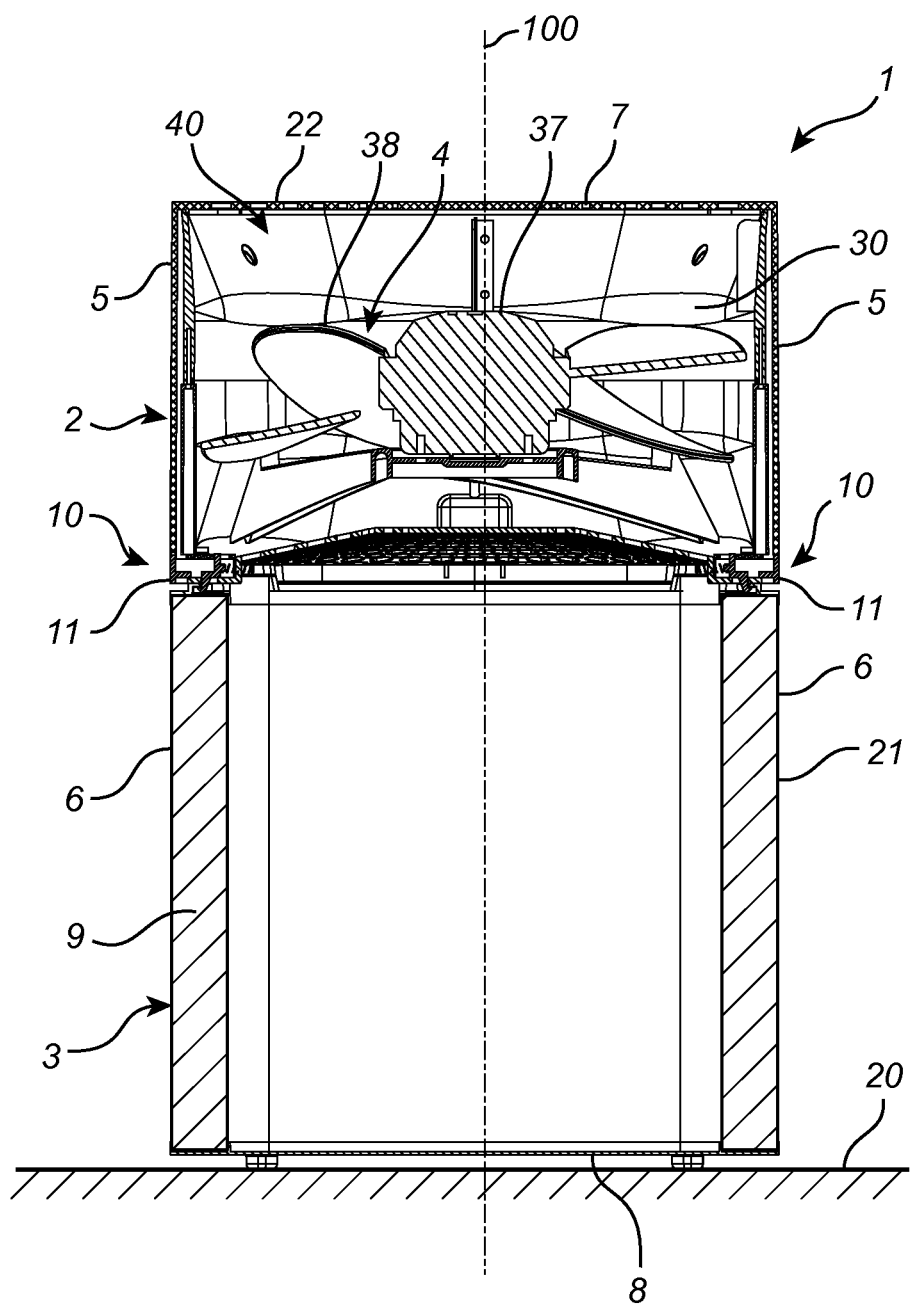
FIG. 2 is a cross-section taken along A-A in FIG. 1.

FIGS. 1 and 2 show an example of an air purifier device 1, which may be suitable for purifying air in indoor spaces, such as rooms in homes and the like domestic environments. The air purifier device 1 may comprise a fan 4 for producing an air flow through the air purifier device 1 and a filter 9 for filtering the air flow produced by the fan 4. The air purifier device 1 may further comprise an ionizing device 40 for ionizing air borne particles in the air flow produced by the fan 4. Preferably, the filter 9 may comprise a dielectric material, such as polypropylene, which facilitates attraction of ionized particles to the filter 9. For example, the filter 9 may be a filter as described in WO98/50162.

The air purifier device has a longitudinal (or vertical) axis 100 extending in an upright direction of the air purifier device 1 when the air purifier device 1 is positioned on the support surface 20 for use. In an embodiment, the air purifier device 1 may have a box-like shape, optionally with one or more rounded edges. For example, the air purifier device 1 may have a square-shaped cross-section (in a horizontal plane) with rounded corners, as illustrated in FIG. 1. Other shapes of the air purifier device 1 may also be envisaged, such as a cylindrical shape. A side wall may extend between a bottom wall 8 adapted to face, and preferably be supported on, the support surface 20 and a top wall 7. Preferably, opposite outer sides of the side wall may be substantially parallel with each other and transverse (such as perpendicular) to the bottom wall 8.

In an embodiment, the air purifier device 1 may be structurally separated into two parts: a filter unit 3, in which the filter 9 is arranged and a fan unit 2, in which the fan 4 may be arranged. The fan unit 2 may be arranged on top of the filter unit 3. For example, the fan unit 2 and the filter unit 3 may both be box-shaped, thereby together forming the box-shaped air purifier device 1. The side wall of the air purifier device 1 may be formed by the side wall 5 of the fan unit 2 and the side wall 6 of the filter unit 3. The filter 9 may be arranged along the side wall of the air purifier device 1, such as circumferentially around the side wall 6 of the filter unit 3. The filter 9 may be protected by a grid arranged outside the filter 9 so as to enclose the filter 9 in the filter unit 3. Optionally, the grid may on its outside be covered by a fabric cover.

In an embodiment, at least a portion of the side wall 6 of the filter unit 3 may form an air intake 21 of the air purifier device 1. Preferably, the air intake 21 may extend circumferentially around the air purifier device 1 so as to be able to take in air from several lateral directions, such as preferably approximately 360 degrees around the air purifier device 1. For example, the air intake 21 may be formed by all four sides of the side wall 6 of the filter unit 3.

In an embodiment, the air purifier device 1 may comprise an exhaust 22 arranged to exhaust air upwards (i.e. roughly along the longitudinal axis 100) from the air purifier device 1. For example, the exhaust 22 may be arranged in the top wall 7, such as in the form of an exhaust grille, as illustrated in FIGS. 1 and 2. The exhaust grille may preferably be free from openings larger than 12 mm, such as free from openings larger than 11 mm, thereby preventing a user's finger from accessing the fan 4.

In an embodiment, the air purifier device 1 may comprise a fan duct 30, in which the fan 4 may be arranged. For example, the fan duct 30 may be arranged in the fan unit 2. The fan duct 30 may extend in an upright direction of the air purifier device 1, i.e. along the longitudinal axis 100 of the air purifier device 1, towards the exhaust 22. The fan duct 30 may be formed by a piece of conduit arranged within the air purifier device 1 (as illustrated in FIG. 2).

Figure 3:
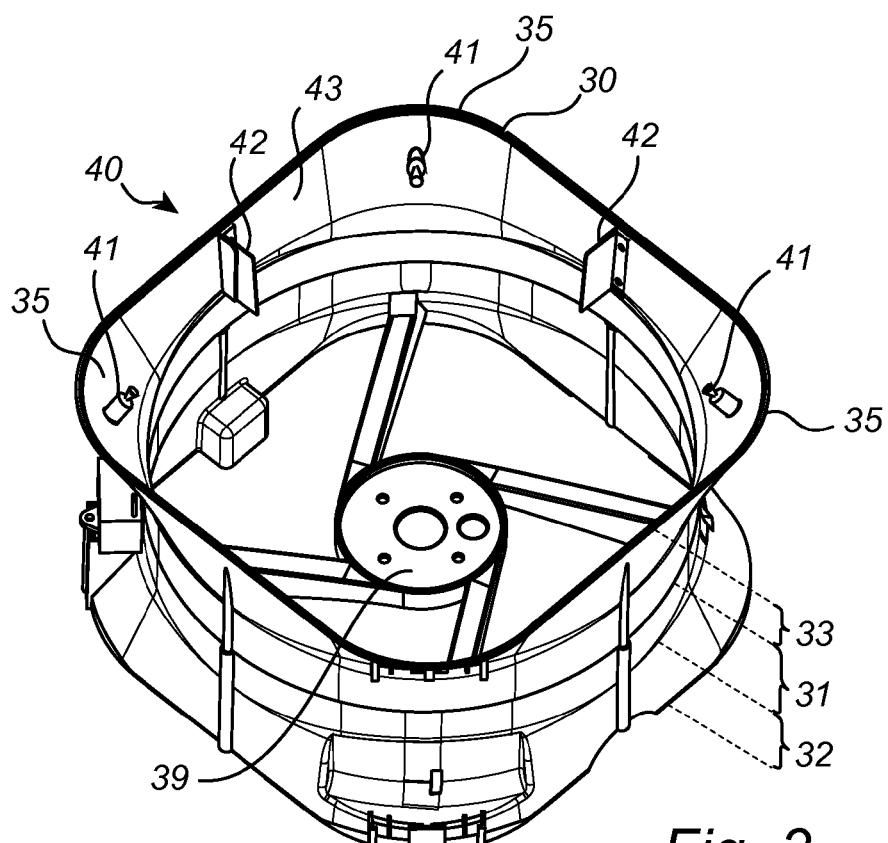
FIG. 3 is a perspective view of a fan duct and an ionizing device of the air purifier device.
Figure 4:
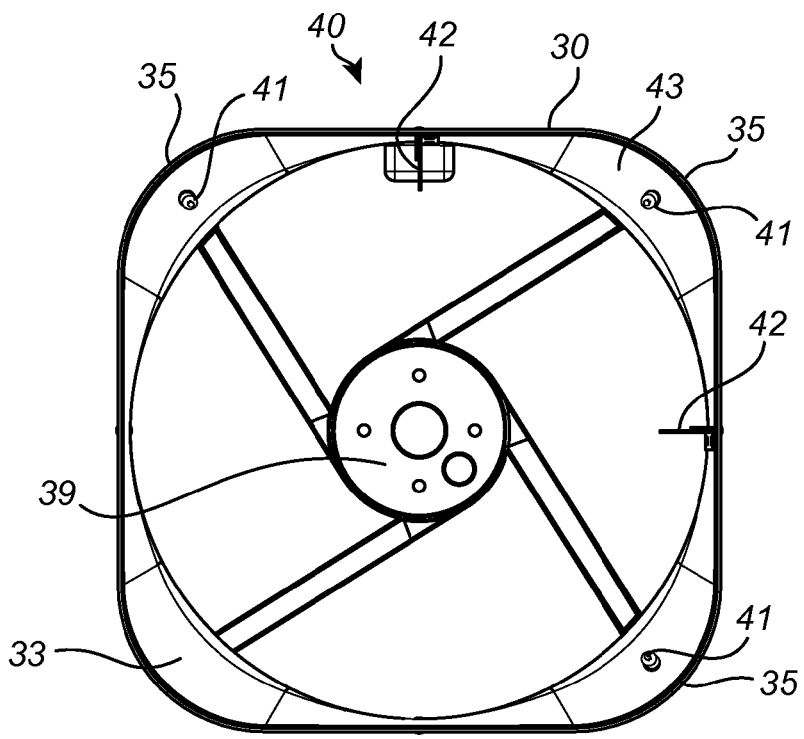
FIG. 4 is a top view of the fan duct and the ionizing device shown in FIG. 3.

Embodiments of the fan duct 30 will be described in more detail with reference to FIGS. 3 and 4. FIG. 3 is a perspective view of the fan duct 30, which for the sake of clarity is separated from the air purifier device 1, and FIG. 4 is a top view of the fan duct 30.

The fan duct 30 may comprise an intermediate portion 31, an upper flared portion 33 and a lower flared portion 32. Hence, the fan duct 30 is flared towards both its ends, whereby the intermediate portion 31 is narrower than the end portions of the fan duct 30. Preferably, the inner walls of the fan duct 30 may be smooth and, thus, free form sharp edges, corners or the like. In particular, the transition between the intermediate portion 31 and the flared portions 31, 32 may be smooth.

The fan 4 may be arranged at least partly within the intermediate portion 31. The diameter of the intermediate portion 31 may be adapted to (such as be slightly smaller than) the diameter of the fan 4. Preferably, the height (i.e. in direction along the longitudinal axis 100) of the blades 38 of the fan 4 may correspond to, or be slightly shorter than, the height (or length) of the intermediate portion 31 for reducing the amount of air passing beside instead between the blades 38 of the fan 4. Hence, the blades 38 of the fan 4 may preferably be completely contained in the intermediate portion 31. For example, the fan 4 may be centered (at least in the direction of the longitudinal axis 100) in the intermediate portion. The fan duct 30 may comprise a support structure 39 arranged to support the fan 4 in the fan duct 30.

In an embodiment, the intermediate portion 31 may have a circular cross-section (in the horizontal plane), thereby being adapted to the circular operation pattern of the fan 4. Further, the fan duct 30 may have square shaped ends, preferably with rounded corners 35, as illustrated in FIGS. 3 and 4. Preferably, the circular shape of the intermediate portion 31 may gradually transform into the square-like shape along the flared portions towards the ends of the fan duct 30.

In an embodiment, an inlet grille 36 (shown in FIG. 2) may be arranged at the lower end of the fan duct 30, which, in similarity with the exhaust grille (at the exhaust 22), preferably may be free from openings larger than 12 mm, such as free from openings larger than 11 mm, thereby preventing a user's finger from accessing the fan from the lower side of the filter unit 2. Further, the air intake area of the inlet grille 36 may be larger than the air exhaust area of the exhaust grille, for example by comprising more and/or bigger holes than the exhaust grille.

In an embodiment, the air purifier device 1 may comprise an ionizing device 40 arranged to ionize air borne particles in the air flow through the air purifier device 1. The Ionizing device 1 may e.g. be positioned in the fan duct 30, preferably on a downstream side of the fan 4. The ionizing device 1 may thus be positioned just before the exhaust 22 (with reference to the air flow direction).

Alternatively, the air purifier device may be arranged such that the ionizing device is arranged on an upstream side of the filter and/or the fan (not shown).

In an embodiment, the ionizing device 40 may comprise one or more emitter electrodes 41 connectable to a source of electric potential and one or more collector plate electrodes 42 connectable to ground, or virtual ground, potential, and arranged in a chamber (which may be referred to as an ionizing chamber). The emitter electrodes 41 e.g. may be formed as brush electrodes and/or pin electrodes e.g. made of carbon. The collector plate electrodes 42 may e.g. comprise pieces of sheet metal attached to the side wall 43. The chamber may e.g. be formed by the upper end portion 33 of the fan duct 30. The chamber (e.g. the entire fan duct 30) may be made of (such as molded in) plastics. The collector plate electrodes 42 may extend from a side wall 43 of the chamber and inwards in the chamber (such as substantially towards the middle of the chamber), and preferably along (such as substantially parallel with) a main direction of the air flow (such as substantially along the longitudinal axis 100 of the air purifier device 1).

In the present example, the ionizing device 40 may comprise three emitter electrodes 41 and two collector plate electrodes 42, which provides an improved electrical field for ionizing air borne particles in the air flow. Preferably, a first one of the emitter electrodes 41 may be arranged opposite to a second one of the emitter electrodes 41, and a first one of the two collector plate electrodes 42 may be arranged between the first emitter electrode and a third one of the emitter electrodes 41. Further, a second one of the two collector plate electrodes 42 may be arranged between the second emitter electrode and the third emitter electrode. In the present example, the three emitter electrodes 41 may preferably be positioned in three of the four rounded corners 35 (forms jutting portions) of the square-like shaped chamber, and each collector plate electrode 42 may be positioned in-between two emitter electrodes 41, such as on one of the sides of the four-sided chamber, as illustrated in FIGS. 3 and 4. Hence, the emitter electrodes 41 and the collector plates 42 may be positioned in an asymmetric manner in the chamber, which has the surprising effect of an improved ionizing rate achieved by the ionizing device 1. Preferably, the distance between an emitter electrode 41 and the motor 37 (shown in FIG. 2) of the fan 4 may be larger than the distance between an emitter electrode 41 and one of the collector plates 42, which e.g. may be achieved by the arrangement of the emitter electrodes 41 and the collector plates 42 according to the present example.

When an electric potential is applied to the emitter electrodes 41, an electromagnetic (EM) field is formed generally between the emitter electrodes 41 and the collector plate electrodes 42. When molecules and/or air borne particles pass the EM field in the chamber, they may be ionized. With the ionizing device 40 according to the present example, the magnitude of the EM field strength is larger towards the side wall 43 than in the middle of the chamber, which is advantageous in that the EM field is concentrated where most of the air passes the chamber and the risk of the motor 37 of the fan being charged by the EM field is reduced.

Preferably, the air purifier device 1 may be configured to apply a constant negative electric potential to the emitter electrodes 41, whereby mostly negative ions (anions) are created. Preferably, an electric potential around −7 kV may be applied. Lower electric potentials, such as around −20 kV may increase the output of ozone. However, applying an alternating voltage over emitter-collector pairs comprised in the air purifier device may alternatively be envisaged.

Figure 5:
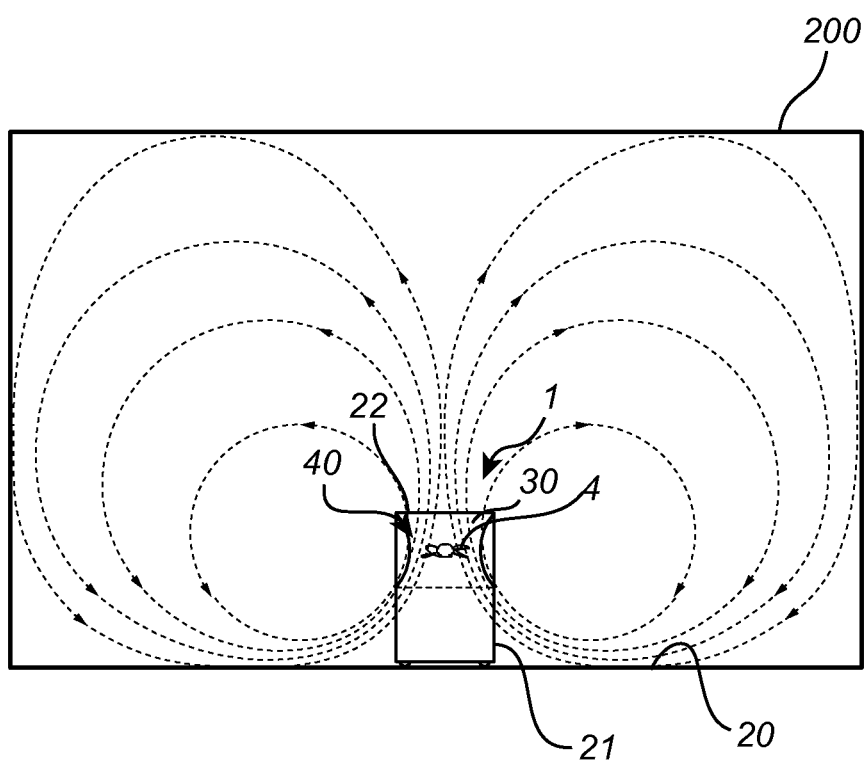
FIG. 5 schematically illustrates the air purifier device in operation in a room.

With reference to FIG. 5, an example of operation of the air purifier device 1 will be described. FIG. 5 shows the air purifier device 1 positioned on a floor 20 in a room 200. Preferably, the air purifier device 1 may be positioned to be spaced apart from the walls of the room 200. When the fan 4 operates, air is taken in through the air intake 21 laterally around the lower part of the air purifier device 1 and is then conducted upwards by the fan duct 30 to the exhaust 22 where the air is exhausted partly upwards and partly laterally. The shape of the fan duct 30 having flared end portions promotes the air circulation in the room 200 as illustrated in FIG. 5, as the air is directed to better follow the room shape. Air is directed slightly upwards and sideways from the exhaust 22, is guided along the ceiling, the walls and the floor 20 of the room 200 and is then taken in slightly from below and sideways via the air intake 21, whereby turbulence in the air circulation in the room can be reduced. The improved air circulation in turn improves the air purification in the room 200.

The air may pass the ionizing device 40 before exiting the exhaust 22, whereby air borne particles in the air flow may be ionized. Some of the ionized particles may then adhere to the collector plate electrodes 42 and some may follow the air flow out of the air purifier device 1 and back to the air intake 21 of the air purifier device 1 whereupon the particles adhere to the filter. Some ionized particles may be attracted to each other and form clusters, which may be retrieved to the air purifier device 1 by the air flow. Due to the improved air circulation achieved by the fan duct 30, an increased amount of the exhausted ionized particles and clustered particles are retrieved to the air purifier device 1 instead of adhering to the ceiling, walls and/or floor of the room 200, where they may be neutralized. Some of the particles adhered to the walls in that way may subsequently dislodge from the wall and pollute the air again. Further, as the ionizing device 40 is arranged downstream relative to the fan 4, the fan 4 is less (or even not at all) charged by the ionized particles.

In an embodiment, the air purifier device 1 may comprise a coupling mechanism 10 for securing the fan unit 2 on top of the filter unit 3. The coupling mechanism 10 will be described in more detail with reference to FIGS. 6 and 7.

Figure 6:
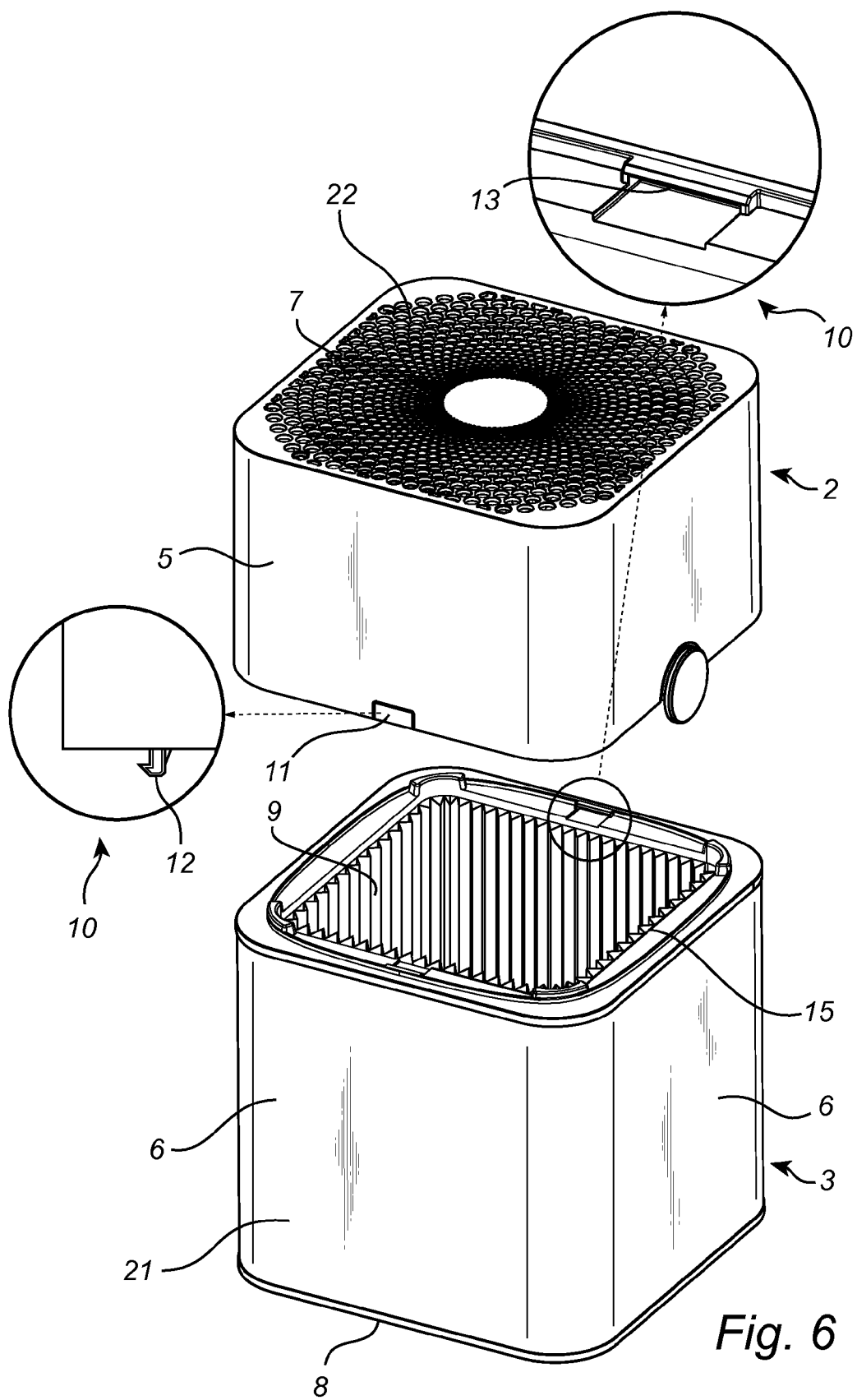
FIG. 6 shows the air purifier device of FIG. 1 with a fan unit separated from a filter unit of the air purifier device and enlargements of engagement parts of a coupling mechanism of the air purifier device.
Figure 7:
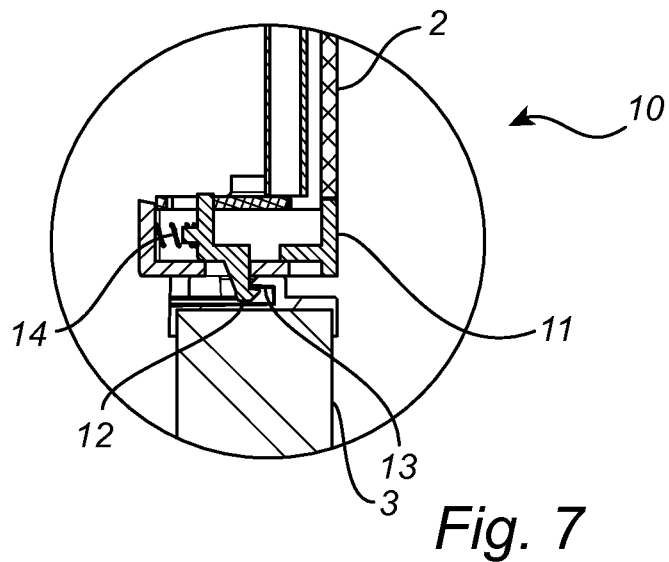
FIG. 7 is an enlarged cross-sectional view of the coupling mechanism of the air purifier device.

The coupling mechanism 10 may comprise two release means 11 (or release actuators) arranged on opposite outer sides of the side wall 5 of the fan unit 2. The release means 11 may e.g. be formed by release buttons, as illustrated in FIGS. 6 and 7. Alternatively, the release means 11 may be formed by e.g. release levers or the like. Each release means 11 may be coupled to a fan engagement part 12 arranged in the fan unit 2 and adapted to engage with a filter engagement part 13 arranged in the filter unit 3. For example, the filter engagement part 13 may comprise a recess and the fan engagement part 12 may be shaped as a hook adapted to mate in the recess, or vice versa. Further, the fan engagement part 12 may be movable by actuation of the release means 11, such as by pushing the release button 11, into an unengaged position, in which the fan engagement part 12 does not engage the filter engagement part 13. In this unengaged position, the fan unit 2 can be removed from the filter unit 3. A resilient means 14, such as a spring, may be arranged to urge the fan engagement part 12 into a position in which it is able to engage the filter engagement part 13 when the fan unit 2 is positioned on the filter unit 3. The fan engagement part 12 may be integrated in the same component as the release means 11, such as moulded in the same piece of plastic.

The filter unit 3 may comprise a geometric feature, such as an edge 15, adapted to mate with a corresponding geometric feature in the fan unit 2 (not shown) for facilitating mating the fan unit 2 in the right position on top of the filter unit 3.

In an embodiment, the whole filter unit 3 may be a disposable. Hence, for changing filter 9 of the air purifier device 1, the whole filter unit 9 may be replaced by a new filter unit. Alternatively, the filter 9 may be removably arranged in the filter unit 3, thereby enabling a user to remove the filter 9 from the filter unit 3 to replace it by a new filter. For example, the filter 9 may be arranged to be slid into the side wall 6 of the filter unit 3, preferably from above in a direction along the longitudinal axis 100 of the air purifier device 1 (not shown).

Figure 8:
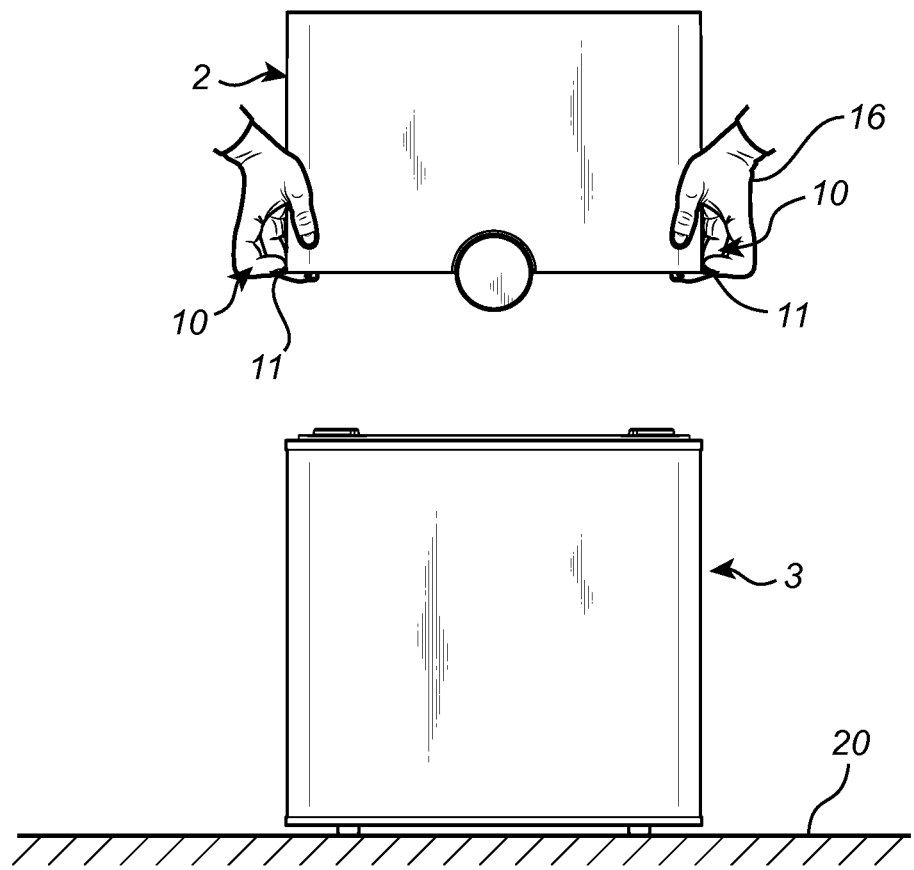
FIG. 8 illustrates the fan unit being removed from the filter unit by a user.

With additional reference to FIG. 8, operation of the coupling mechanism 10 for changing filter 9 will be described. A user 16 may put both hands on opposite sides of the fan unit 2 and simultaneously push (or in any other way actuate) the release means 11 and pinch (or grab) the fan unit 2. When the release means 11 are actuated, the fan engagement part 12 becomes unengaged with the filter engagement part 13, whereby the user 16 may lift the fan unit 2 off the filter unit 3.

The user may then position the fan unit 2 on top of a new filter unit (in case the filter unit 3 is a disposable filter unit 3). Alternatively, the user may remove the filter 9 from the filter unit 3 and insert a new filter (in case merely the filter being disposable).

Then the fan unit 2 may be attached to the filter unit 3 (or on a new filter unit) again. The boxed shape of the fan unit 2 and the filter unit 3 and/or the edge 15 may help (guide) the user to get the fan unit 2 in a correct position on the filter unit 3. Optionally, the release means 11 may be actuated (e.g. pushed) by the user when the fan unit 2 is mated with the filter unit 3 and the released when the fan unit 2 is in position on the filter unit 3. Alternatively, the fan engagement part 12 may comprise a slated edge (as shown in FIG. 7), whereby the fan engagement part 12 may be automatically pushed towards the unengaged position when approaching the recess 13. The user may then not necessarily actuate the release means 11 when putting the fan unit 2 back on top of the filter unit 3.

The person skilled in the art realizes that the present invention by no means is limited to the embodiments described above. On the contrary, many modifications and variations are possible within the scope of the appended claims.

For example, the air purifier device may comprise an alternative ionizing device (or even no ionizing device at all), such as an ionizing device with differently configured emitter electrode, and/or collector plate electrode.

Further, the air purifier device may comprise an alternative fan duct (or even no fan duct at all), such as a non-flared fan duct or any other kind of fan duct.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:
1. An air purifier device comprising:
a fan unit comprising a fan arranged to produce an air flow through the air purifier device,
a filter unit comprising a filter arranged to filter the air flow produced by the fan, the filter unit being adapted to stand on a support surface when the air purifier device is positioned for use, and
a coupling mechanism arranged to secure the fan unit on top of the filter unit,
wherein the coupling mechanism comprises two release actuators arranged on opposite outer sides of the fan unit,
wherein the fan unit is releasable from the filter unit by actuating the two release actuators, and
wherein the fan unit is secured on top of the filter unit in a vertical direction by the coupling mechanism only, and the fan unit is releasable in the vertical direction from the filter unit by only actuating the two release actuators.

2. The air purifier device as defined in claim 1, wherein the two release actuators are two release buttons, and
wherein the fan unit is releasable from the filter unit by pushing the two release buttons.

3. The air purifier device as defined in claim 2, wherein the two release buttons are arranged to be pushed inwards in the air purifying device.

4. The air purifier device as defined in claim 1, wherein the filter unit has a bottom wall adapted to face the support surface when the air purifier device is positioned for use, and
wherein the opposite outer sides of the fan unit extends transverse relative to the bottom wall.

5. The air purifier device as defined in claim 1, wherein the air purifier device has a box-like shape.

6. The air purifier device as defined in claim 1, wherein the coupling mechanism comprises two pairs of engagement parts, each pair comprising:
an engagement part arranged in the fan unit and coupled to the release actuator, and
an engagement part arranged in the filter unit,
wherein the engagement parts of each pair are arranged to engage with each other so as to secure the fan unit to the filter unit, and to be released from the engagement by actuating the release actuators.

7. The air purifier device as defined in claim 1, wherein the filter extends circumferentially along an inner side wall of the filter unit.

8. The air purifier device as defined in claim 1, further comprising an exhaust for exhausting purified air out of the air purifier device, wherein the exhaust is arranged in a top wall of the fan unit.

9. The air purifier device as defined in claim 1, further comprising an ionizing device arranged in the fan unit so as to ionize particles in the air flow.

10. The air purifier device as defined in claim 1, wherein the filter unit is a disposable filter unit.

11. An air purifier device comprising:
a fan unit comprising a fan arranged to produce an air flow through the air purifier device,
a filter unit comprising a filter arranged to filter the air flow produced by the fan, the filter unit being adapted to stand on a support surface when the air purifier device is positioned for use, and
a coupling mechanism arranged to secure the fan unit on top of the filter unit,
wherein the coupling mechanism comprises two release actuators arranged on opposite outer sides of the fan unit,
wherein the fan unit is releasable from the filter unit by actuating the two release actuators, and
wherein the opposite outer sides of the fan unit extend along corresponding opposite outer sides of the filter unit, the corresponding opposite outer sides of the filter unit each being located at a corresponding junction of a top surface of the filter unit and a corresponding side surface of the filter unit.

* * * * *